(12) United States Patent
Waalkes et al.

(10) Patent No.: US 10,122,849 B2
(45) Date of Patent: Nov. 6, 2018

(54) COMPUTER-IMPLEMENTED SYSTEM AND METHOD FOR RETENTION OF CALL RECORDINGS

(71) Applicant: Intellisist, Inc., Seattle, WA (US)

(72) Inventors: Adam Waalkes, Sammamish, WA (US); Gilad Odinak, Bellevue, WA (US); Haodong (Howard) Jiang, Issaquah, WA (US); Matthew Thorn, Seattle, WA (US); Tom McCann, North Bend, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

(21) Appl. No.: 15/682,496

(22) Filed: Aug. 21, 2017

(65) Prior Publication Data

US 2017/0346943 A1    Nov. 30, 2017

Related U.S. Application Data

(63) Continuation of application No. 15/358,090, filed on Nov. 21, 2016, now Pat. No. 9,742,908, which is a continuation of application No. 14/612,226, filed on Feb. 2, 2015, now Pat. No. 9,503,574, which is a continuation of application No. 13/669,388, filed on Nov. 5, 2012, now Pat. No. 8,948,368, which is a continuation of application No. 11/903,240, filed on Sep. 20, 2007, now Pat. No. 8,306,211.

(51) Int. Cl.
*H04M 3/00*       (2006.01)
*H04M 5/00*       (2006.01)
*H04M 3/42*       (2006.01)
*H04M 3/51*       (2006.01)

(52) U.S. Cl.
CPC ..... *H04M 3/42221* (2013.01); *H04M 3/5166* (2013.01); *H04M 3/5175* (2013.01); *H04M 2203/301* (2013.01)

(58) Field of Classification Search
CPC ... H04M 3/422; H04M 3/5166; H04M 3/5175
See application file for complete search history.

(56) References Cited

U.S. PATENT DOCUMENTS 6,122,663 A     9/2000  Lin et al.
7,023,979 B1 *  4/2006  Wu .................... H04M 3/5233
                                          379/265.11

(Continued)

*Primary Examiner* — Simon King
(74) *Attorney, Agent, or Firm* — Patrick J. S. Inouye; Krista A. Wittman

(57) ABSTRACT

A computer-implemented system and method for retention of call recordings are provided. Calls are received and recorded. The calls are provided to an automatic call distributor and criteria associated with the automatic call distributor are applied to the calls. The recordings of the calls that satisfy the criteria are provided to a database. One or more of the calls remaining are transferred to an IVR. Criteria associated with the IVR are applied to the one or more calls remaining. The recording for at least one of the one or more remaining calls that satisfy the criteria associated with the IVR are provided to the database. Each call still remaining is transferred to an agent. Criteria associated with the agents are applied to the calls still remaining. The recording for at least one of the still remaining calls that satisfies the criteria associated with the agents is provided to the database.

20 Claims, 8 Drawing Sheets

(56) References Cited

U.S. PATENT DOCUMENTS

| | | | |
|---|---|---|---|
| 7,027,463 B2 | 4/2006 | Mathew et al. | |
| 7,110,525 B1 * | 9/2006 | Heller | H04M 3/5232 379/265.11 |
| 7,149,303 B1 * | 12/2006 | Laurinavichus | H04M 3/5166 379/265.01 |
| 8,200,527 B1 * | 6/2012 | Thompson | G06Q 10/0639 705/7.38 |
| 9,635,177 B1 * | 4/2017 | Hoffberg | H04M 3/5175 |
| 2005/0086239 A1 | 4/2005 | Swann et al. | |
| 2005/0100138 A1 | 5/2005 | Abraham | |
| 2006/0089837 A1 * | 4/2006 | Adar | H04M 3/2227 705/309 |
| 2006/0265089 A1 * | 11/2006 | Conway | G10L 15/22 700/94 |
| 2007/0036131 A1 | 2/2007 | Shaffer et al. | |
| 2008/0095355 A1 * | 4/2008 | Mahalaha | H04M 3/5233 379/265.09 |
| 2008/0112545 A1 | 5/2008 | Li et al. | |
| 2010/0135475 A1 | 6/2010 | Ueshima | |

* cited by examiner

110

120

130

COMPUTER-IMPLEMENTED SYSTEM AND METHOD FOR RETENTION OF CALL RECORDINGS

CROSS-REFERENCE TO RELATED APPLICATIONS

This U.S. Patent Application is a continuation of U.S. Pat. No. 9,742,908, issued Aug. 22, 2017, which is a continuation of U.S. Pat. No. 9,503,574, issued Nov. 22, 2016, which is a continuation of U.S. Pat. No. 8,948,368, issued Feb. 3, 2015, which is a continuation of U.S. Pat. No. 8,306,211, issued on Nov. 6, 2012, the priority dates of which are claimed and the disclosures of which are incorporated by reference.

FIELD

The present invention relates in general to call center operation and, in particular, to a computer-implemented system and method for identifying call recordings for retention.

BACKGROUND

Customer call centers, or simply, "call centers," are often the first point of contact for customers seeking direct assistance from manufacturers and service vendors. Customer calls are sometimes recorded for quality control, call statistics, and other uses. Customer call recordings provide important feedback to a call center and can be used to improve the call center business. Call recordings can be reviewed to assess an agent's performance, to ensure that a particular sales script is followed, to resolve customer complaints, and to analyze problems with the call center system. The call recordings can also be played for new employees during a training class.

Call centers often receive large volumes of calls from customers seeking assistance or with other needs. FIG. 1 is a functional block diagram showing a prior art call center environment. The call center 10 includes an interactive voice response (IVR) system 17, automatic call distributor (ACD) 13, and agents 14 that provide customer assistance over online terminals. The call center 10 also includes a database 18 to archive customer call recordings.

Operationally, a customer 11 calls into the call center via a telephone 12. The call is received by the ACD 13 and assigned to one of the agents 14 or the IVR 17, which guides the customer 11 into an area of assistance, such as through a caller option tree. The agents 14 can also coordinate with the IVR 17 to provide information to the customer 11. The agents 14 can interact with a legacy system 16 for order fulfillment processing. A call center supervisor 15 manages the agents 14 over a supervisory terminal to ensure that the agents 14 are correctly and efficiently performing their jobs. After the customer interaction is complete, a recording of each call is stored in the database 18.

Saving every call recording indefinitely entails significant storage overhead, especially for call centers with large caller volumes. Conversely, new call recordings cannot be stored until storage space becomes available, which can force the deletion of call recordings of potential importance. FIG. 2 is a line graph showing, by way of example, hypothetical call recording storage consumption. The x-axis 22 represents a number of call recordings stored. The y-axis 21 represents the amount of available storage space. The database is progressively and steadily filled as every call recording is saved over time. Once full, saved call recordings must be deleted to make room for the new recordings, as the total amount of storage space remains finite. However, wholesale call recording deletion generally non-selectively erases all calls, regardless of content, relevance, importance, or the other retention criteria. Thus, call centers routinely only retain the call recordings over predetermined time intervals, dependent on caller volume and available storage space.

Many of the stored call recordings, such as routine or informational calls, can remain in the database without further review. Storing these call recordings needlessly occupies storage space, as calls that are not further reviewed need not be saved. However, even without the unneeded calls, the amount of available storage space can be rapidly filled.

Locating a single call recording or a group of call recordings can be complicated by large databases, which generally lack indexing for call retrieval by context or nature. Rather, call recordings are often stored and identified by time and date. Thus, searching for a particular call can be frustrating and time-consuming and as the number of call recordings in the database increases, finding a call recording becomes increasingly difficult.

Therefore, there is a need for an approach that reduces call recording storage overhead and which facilitates call retrieval by selectively saving calls based upon specific criteria.

SUMMARY

A system and method selectively retain call recordings into a call center. A multiplicity of calls are received into a call center and the nature of each call is determined. Each call is temporarily saved. One or more of the saved calls is retained by performing a plurality of evaluations against retention criteria. The saved calls that are not retained are discarded. Each of the retained calls is stored as a recording identified by the nature of the corresponding call.

An embodiment provides a computer-implemented system and method for retention of call recordings. A plurality of calls are received and recorded. The calls are provided to an automatic call distributor and criteria associated with the automatic call distributor are applied to the calls. The recordings of the calls that satisfy the criteria are provided to a database. One or more of the calls remaining are transferred to an IVR and criteria associated with the IVR are applied to the one or more calls remaining. The recording for at least one of the one or more remaining calls that satisfy the criteria associated with the IVR are provided to the database. Each call still remaining is transferred to an agent and criteria associated with the agents are applied to the calls still remaining. The recording for at least one of the still remaining calls that satisfies the criteria associated with the agents is provided to the database.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and several details are capable of modifications in various obvious respects, all without departing from the spirit and the scope of the present invention. Accordingly, the drawings and detailed description are to be regarded as illustrative in nature and not as restrictive.

DETAILED DESCRIPTION

Except as otherwise stated, as used herein, the terms "caller," "user," and "customer" are used interchangeably to refer to a customer to a call center. An "agent" is an individual that directly interacts with a caller voice-to-voice. A "guide" is an individual that interacts indirectly with a caller through playback to the caller of automated prompts and scripted scenarios or by reviewing spoken caller responses for manual correction or intervention. An "operator" is an individual that is not assigned to specific calls, but is available to manually direct callers to an area of customer service as a means to "by-pass" a caller option tree or menu. Otherwise, the terms "agent," "guide," and "operator" are used interchangeably to refer to an individual that provides service provisioning to a customer for the automated call center.

System Overview

Figure 3:
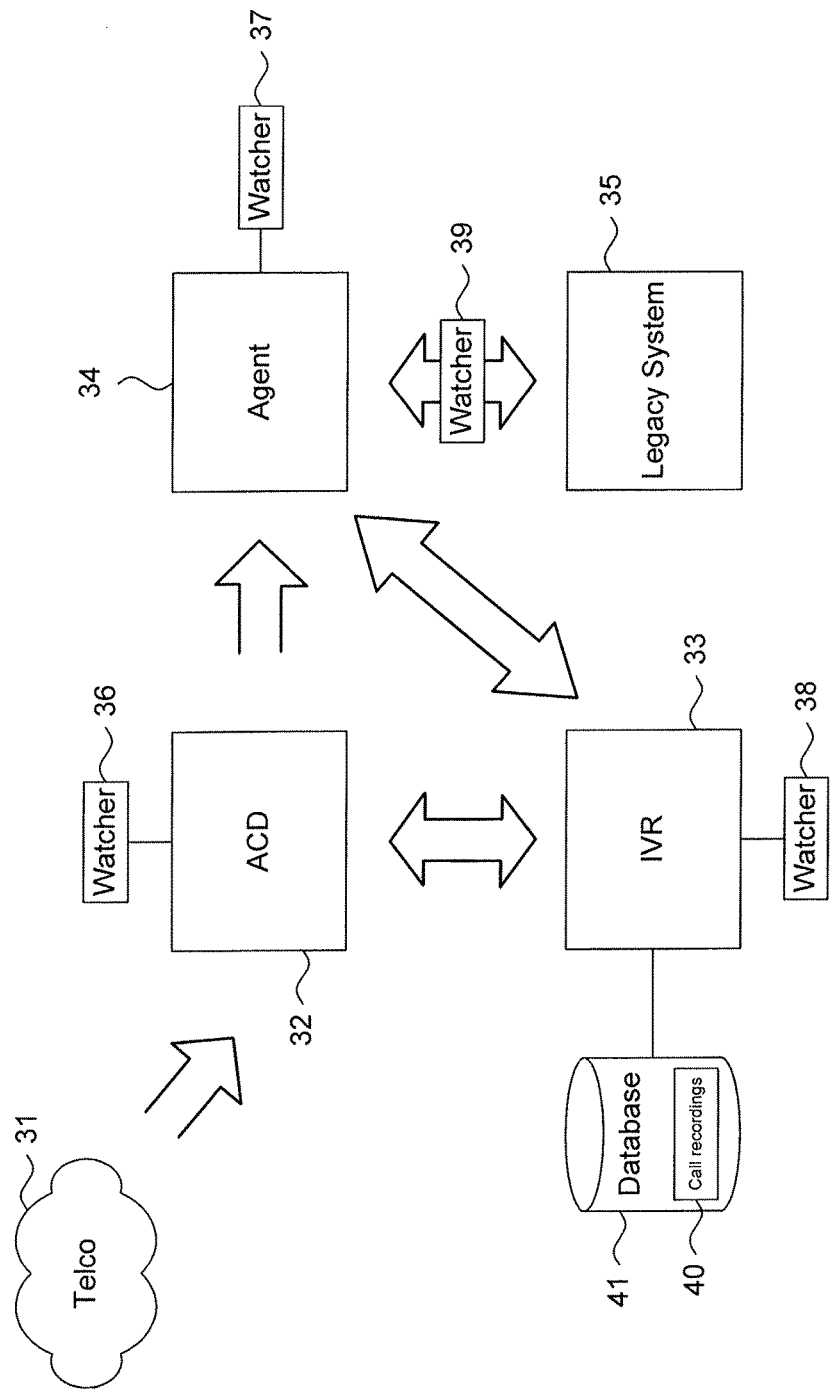
FIG. 3 is a block diagram showing a system for retaining calls into a call center in accordance with one embodiment.

Traditional call centers typically receive large volumes of customer calls. After each call is complete, a recording of the call is stored for further reference. Calls centers can experience difficulty storing the calls or conducting a search for a particular call due to a large caller volume. However, selectively saving calls, including identifying information, such as the nature of the call, can assist a call center in storing, managing, and searching the selected calls. FIG. 3 is a block diagram showing a system 30 for retaining calls into a call center in accordance with one embodiment. A multitude of telephone calls are received into an ACD 32 via a Private Branch Exchange (PBX) or other telephonic connection 31 for distribution. The ACD 32 initially assigns each call to an IVR 33 or call center agent terminal 34. Call recording begins following initial assignment and can continue until call termination or recording override. Call recording could also begin or end at any time. Each call recording is temporarily stored in a storage device (not shown) for holding during the call. The storage device can be located on the ACD 32, IVR 33, or agent terminal 34, as well as on other system components.

The IVR 33 provides an automated call interface. If the call is distributed to the IVR 33, the customer may be required to enter personal information or select options listed on a voice-prompted menu. After the customer has entered any information requested, the call can be directed to the agent terminals 34 for further processing, or the customer can continue interacting with the IVR 33. Alternatively, the call can be directly distributed to the agent terminals 34. The decision to direct an incoming call to the agent terminals 34 or the IVR 33 is dependent upon the set up of the call center. Further, the call can include any combination of interactions between the customer and the IVR 33 or the agent terminals 34. Other forms of call assignment and processing are possible.

Watchers 36-39 passively monitor the calls received into the call center at various points, including at the ACD 32, IVR 33, agent terminals 34, and the interface to the legacy system 35, as well as other points. Each watcher 36-39 applies call retention criteria, which can be stored in the watcher 36-39 itself or at other locations. The watchers 36-39 can thus monitor the calls during call distribution, call processing, call holding, and legacy call processing. Other call monitoring locations and times are possible.

Once a call satisfies one or more criteria, all or part of the call recording 40 is transferred from the temporary storage device for storing in a call center database 41, or other storage location. The call recordings can be identified by call factors, criteria, and other call related information. The call factors describe the nature of the call by determining a reason for the call or call identifiers, such as a call confirmation number. The call factors can be provided by a customer in response to a request from the agent or IVR. Alternatively, the call factors can be assigned by the agent or supervisor. Other call factors are possible. The call criteria used to monitor and retain the calls can also be used for identifying the stored calls, such as by telephone number, upsell, or large order. The call criteria are further discussed with reference to FIGS. 6-10. The call factors and call criteria can overlap. For example, the nature of the call, such as placing an order, can also satisfy predetermined call criteria for retaining the call. Retained calls are thereafter available for call review and evaluation. For instance, a call agent or supervisor could access the database of stored calls to conduct a search for one or more call recordings using the corresponding call factors and criteria.

Figure 11:
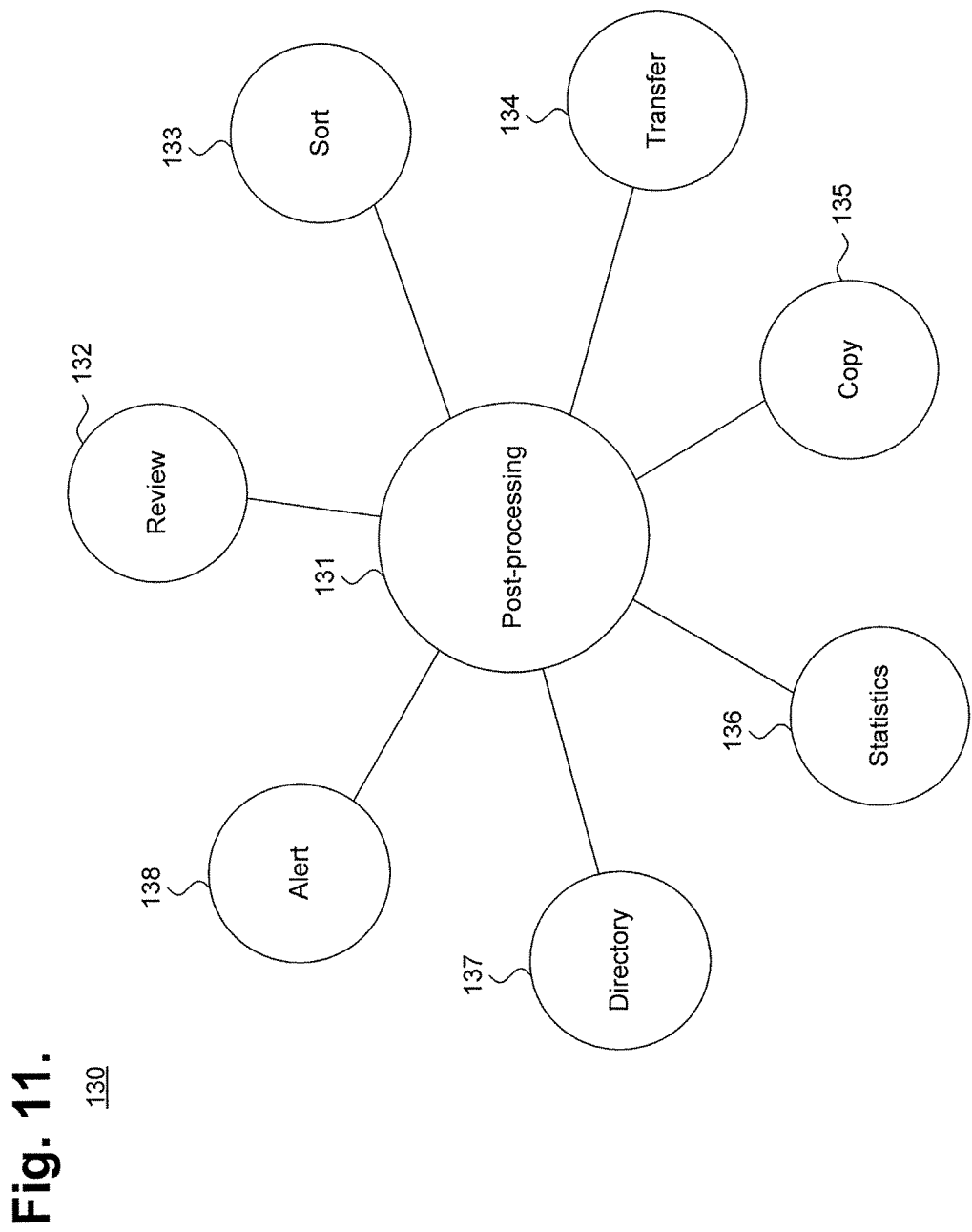
FIG. 11 is a data flow diagram showing post-processing action.

Each call stored can be listed in a directory, which is further discussed with reference to FIG. 11. The directory identifies each call by corresponding call factors regarding the nature of the call and corresponding criteria. Within the directory, the calls can be sorted, searched, and viewed using one or more of the call factors or criteria. For example, a particular call can be found by numerically sorting the directory of calls using a call confirmation number. Alternatively, the call confirmation number can be entered into a search field for locating the call associated with the number.

Retaining Select Calls

Generally, conventional call centers err on the side of over-inclusively recording and storing all calls received. If necessary, the call recordings can be used for reviewing a transaction, teaching new agents, or other uses. While the call recordings can be helpful to a call center for evaluating business concerns, not all calls provide information that can be used as a reference. Informational calls, such as requests for business hours, are routine and lack substantive information. Thus, saving only selected call recordings can ensure that potentially relevant or useful calls will be saved, while others are discarded.

Figure 4:
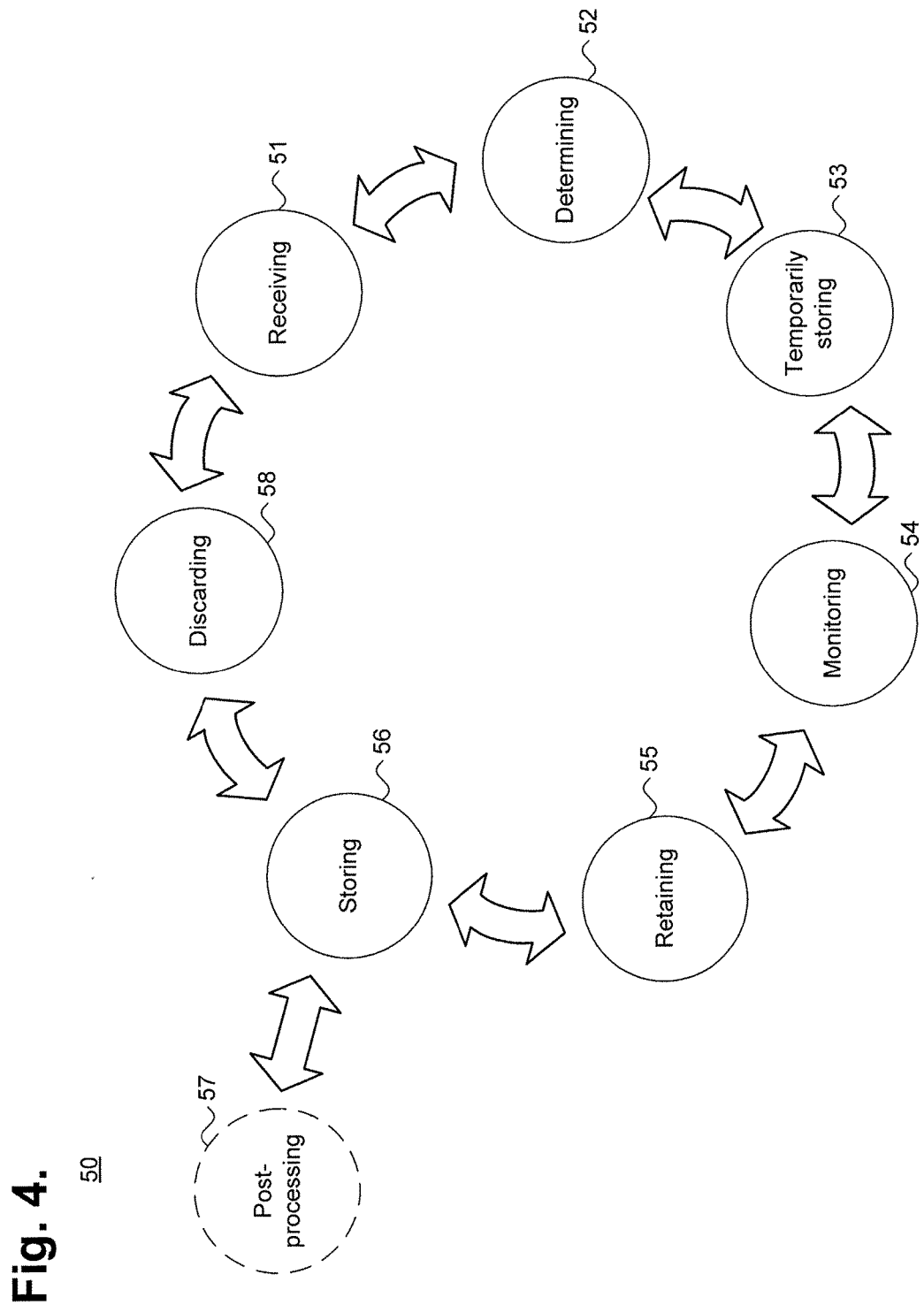
FIG. 4 is a process flow diagram showing a method for retaining calls into a call center in accordance with one embodiment.

FIG. 4 is a process flow diagram showing a method 50 for retaining calls into a call center in accordance with one embodiment. A call center receives 51 a telephone call from a customer and initially assigns the call to begin a call interaction between the customer and either an agent, which is a live person; with a guide, through an automated prompt that is under the supervision of a live person; or through automated voice response. The caller could also bypass automated voice response and talk in-person to an operator. As well, the caller assignment may change as the call progresses. For instance, the caller may start with a guide and later be reassigned to an agent once caller purpose is determined. Recording of the call can begin following initial assignment, or at any other time during the call. An ACD distributes the call to an agent or IVR for further processing. The nature of the call is determined 52 and described by call factors, such as the reason for the call or call identifiers. The call recording is temporarily stored 53 for holding during the call. Watchers monitor 54 the call for retaining 55 based upon the satisfaction of one or more criteria, as further described below with reference to FIGS. 6-10. The retained call recordings are transferred from the temporary storage device to a call center database for organizing and storing 56. Those calls not retained can be discarded 58. In a further embodiment, post-processing actions 57 can be performed upon the stored call recordings, as further described below with reference to FIG. 11.

Figure 1:
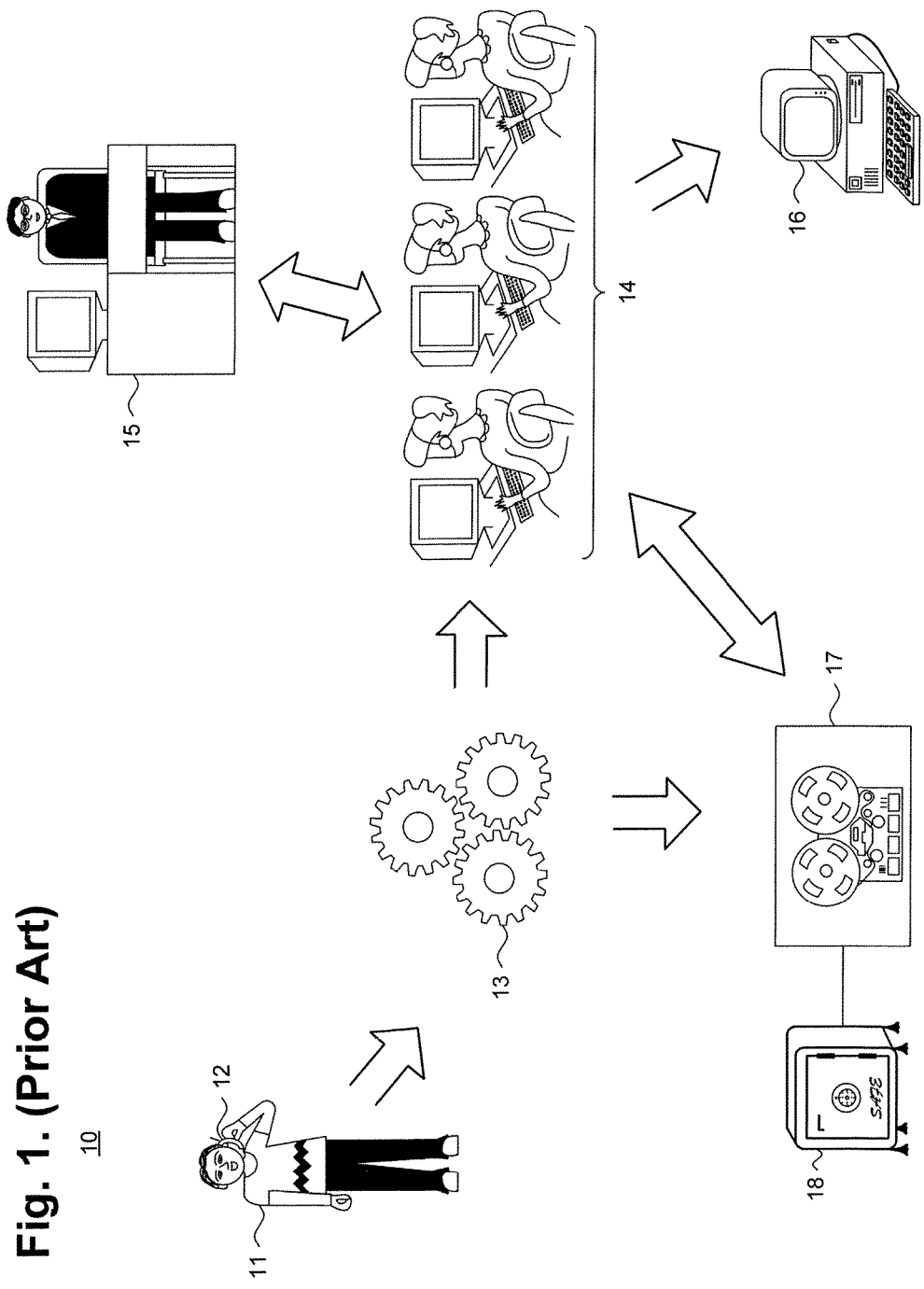
FIG. 1 is a functional block diagram showing a prior art call center environment.
Figure 2:
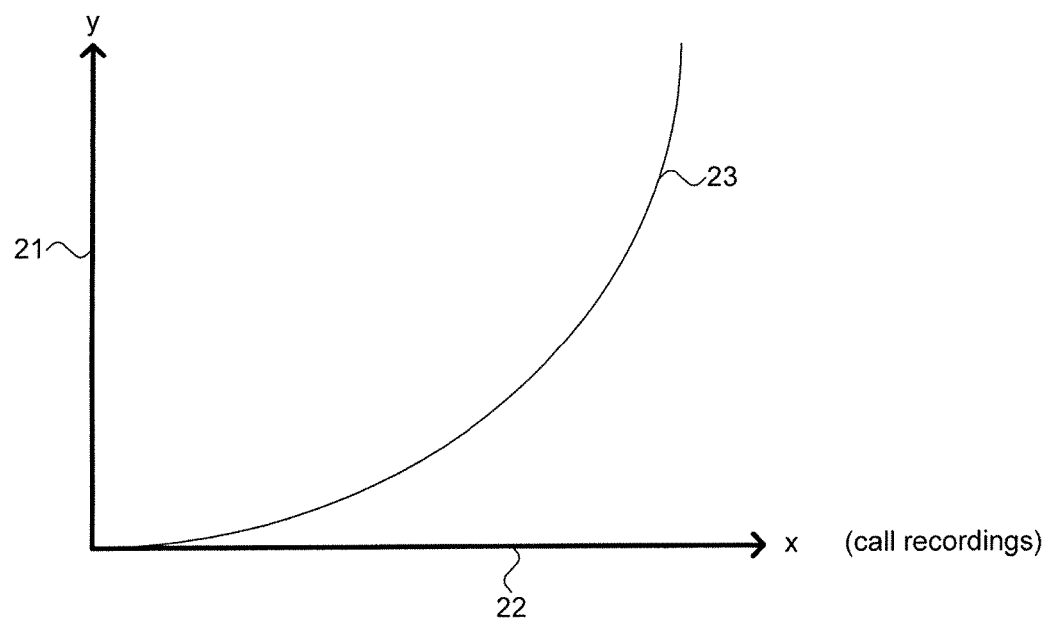
FIG. 2 is a line graph showing, by way of example, hypothetical call recording storage consumption.
Figure 5:
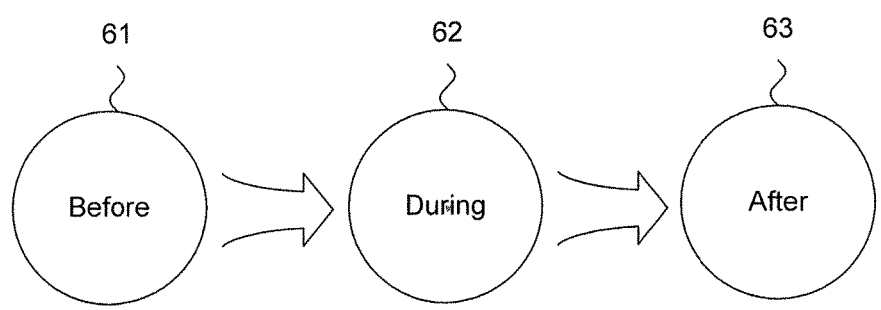
FIG. 5 is a process flow diagram showing the stages of call recording storage.

The call recordings can be retained and stored at different times, such as prior to an interaction between the customer and the call center, during the interaction, or after the interaction. FIG. 5 is a process flow diagram showing the stages 60 of call recording storage. A call can be retained and stored prior to an interaction based on selection criteria. A watcher coupled to an ACD can monitor each call before accepting and sending the call to an IVR or agent terminal. However, if the call is not retained for storing prior to the interaction, the call can later be retained for storing by the watcher, an agent, or a supervisor during 62 the interaction. Watchers coupled to the agent terminal, IVR system, or at the interface to the legacy system monitor the customer interaction and retain the call if at least one pre-determined criteria is met. However, the agent or supervisor can independently choose to retain a call if the agent or supervisor believes that the call can be used as a reference or for similar reasons. In addition, the supervisor can override decisions by the agent or the watcher.

Finally, if the call is not retained for storing before or during the interaction, the call can be retained after 63 the call transaction is complete. The watchers coupled to the agent terminal, IVR system, or at the interface to the legacy system can retain the call recording if one or more criteria are met. Additionally, the agent or supervisor can independently choose to store the call recording if the call provides a useful reference. The supervisor can override any decisions by the agent or the watchers.

Some criteria can be used across each of the time periods of the caller interactions, while others can only be used for retaining call recordings during a specific time period. The criteria are discussed further with reference to FIGS. 6-10. Other criteria and methods for applying the criteria are possible, as well as other stages for determining call storage.

The call criteria used for retaining a call can be determined by the agents, supervisor, or other individuals, by company policy, or any other metric. By setting the criteria for retaining a call, the call recordings are limited to only potentially relevant, useful, or otherwise helpful calls, thereby lowering storage needs. The criteria can be programmed into the watchers individually or by groupings, such as by content, customer identification, location and target identification, behavior, and call center criteria. Other groupings are possible and the criteria can overlap between groupings.

Figure 6:
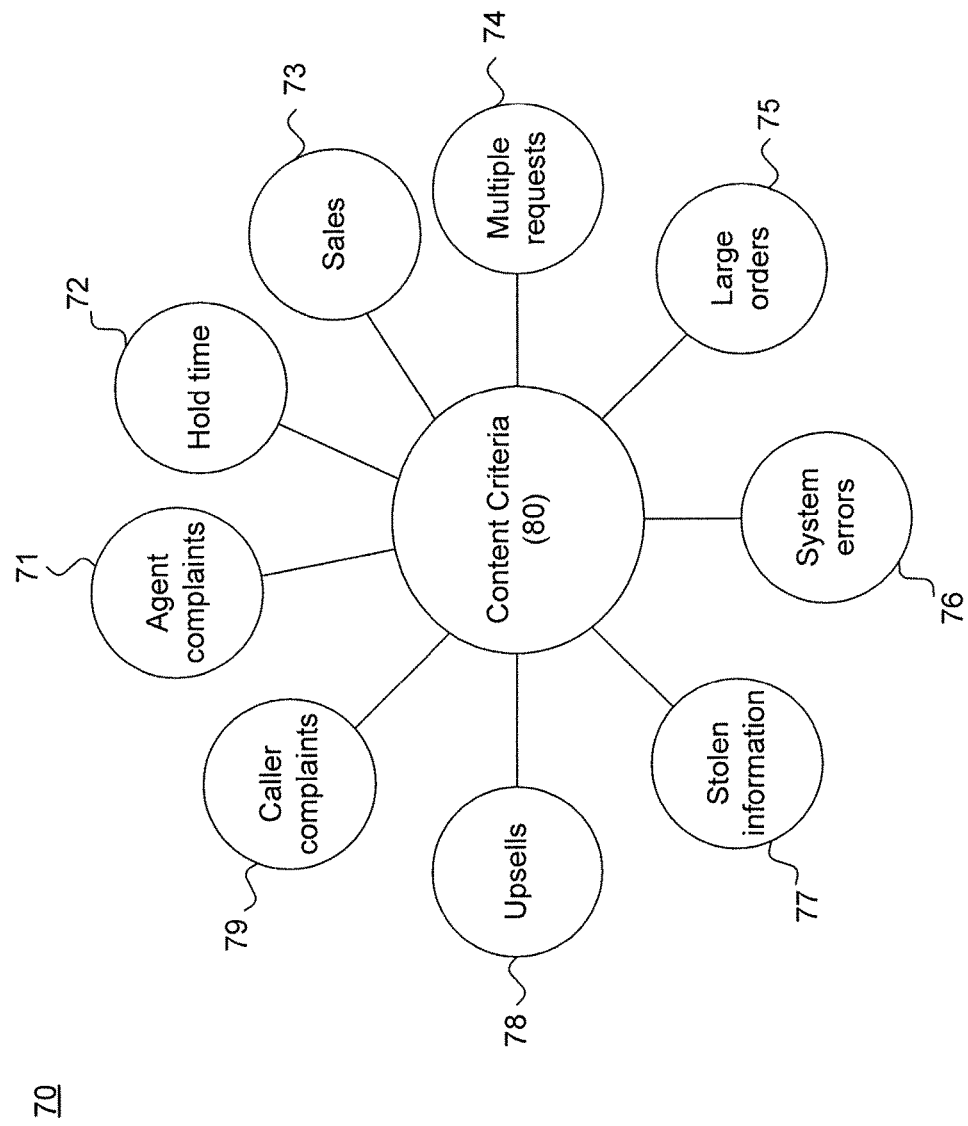
FIG. 6 is a data flow diagram showing content criteria for retaining call recordings into a call center.

The content criteria describe the nature and content of a call interaction between a caller and a call center. FIG. 6 is a data flow diagram 70 showing content criteria 80 for retaining call recordings into a call center. The criteria 80 are intended to identify and retain those calls that can be considered useful or otherwise helpful to a call center business. The content criteria 80 include agent complaints 71, hold time 72, sales 73, multiple requests 74, large orders 75, system errors and malfunctions 76, stolen or suspect information 77, upsells 78, and customer complaints 79. Other content-related criteria are possible. These criteria and other considerations may be useful for identifying content received from a customer or other sources during the call interaction, which can be considered important or helpful. If one or more criteria are satisfied, the call is retained and stored in a call center database prior to commencing the interaction. Otherwise, if no criteria have been satisfied, the call recording can be discarded. For example, a customer calls into a shopping call center to order five tee shirts, two pairs of jeans, and three pairs of shoes. The large order criteria 75 is triggered by item type or total amount of money spent. Here, the customer's order meets the large order criteria 75 and a recording of the call will be retained. A call manager or supervisor can later obtain the call recording to review whether a particular call agent contributed to the large order by offering sale or upsell items. In contrast, if the large order criteria 75 was not met, the call recording would be discarded, absent other criteria satisfaction.

Figure 7:
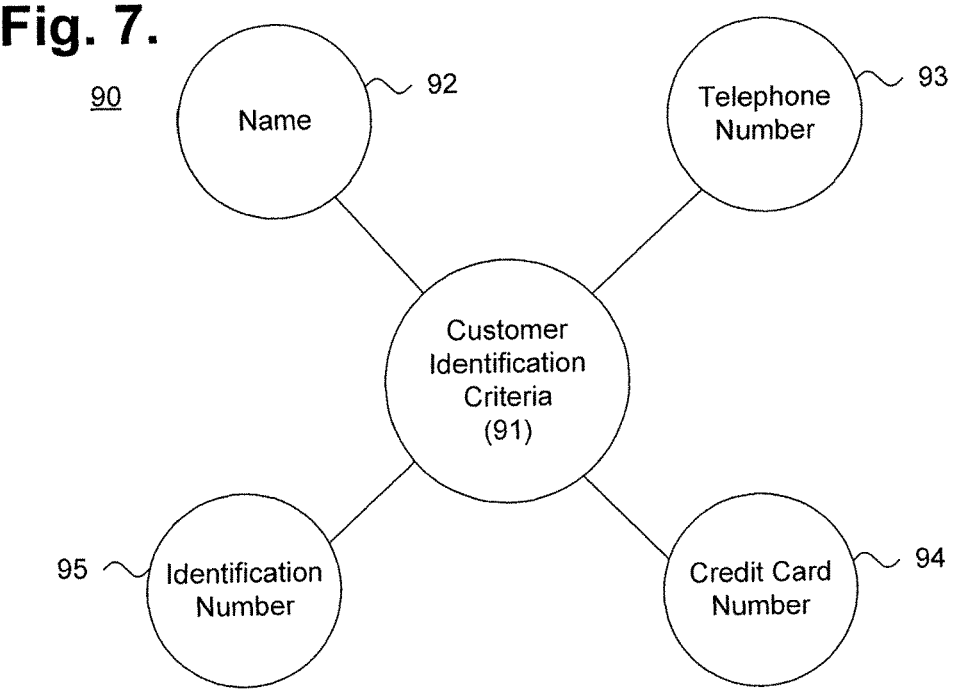
FIG. 7 is a data flow diagram showing customer identification criteria for retaining call recordings into a call center.

The customer identification criteria can identify customers calling into a call center. FIG. 7 is a data flow diagram 90 showing customer identification criteria 91 for retaining call recordings into a call center. The criteria 91 include a customer name 92, telephone number 93, credit card number 94, and customer identification number 95. The customer identification criteria 91 can be useful for identifying and retaining calls from particular individuals or customer types, such as premium customers, difficult customers, or customers associated with a particular special interest group, as well as other uses. Other customer identification criteria 91 are possible.

Figure 8:
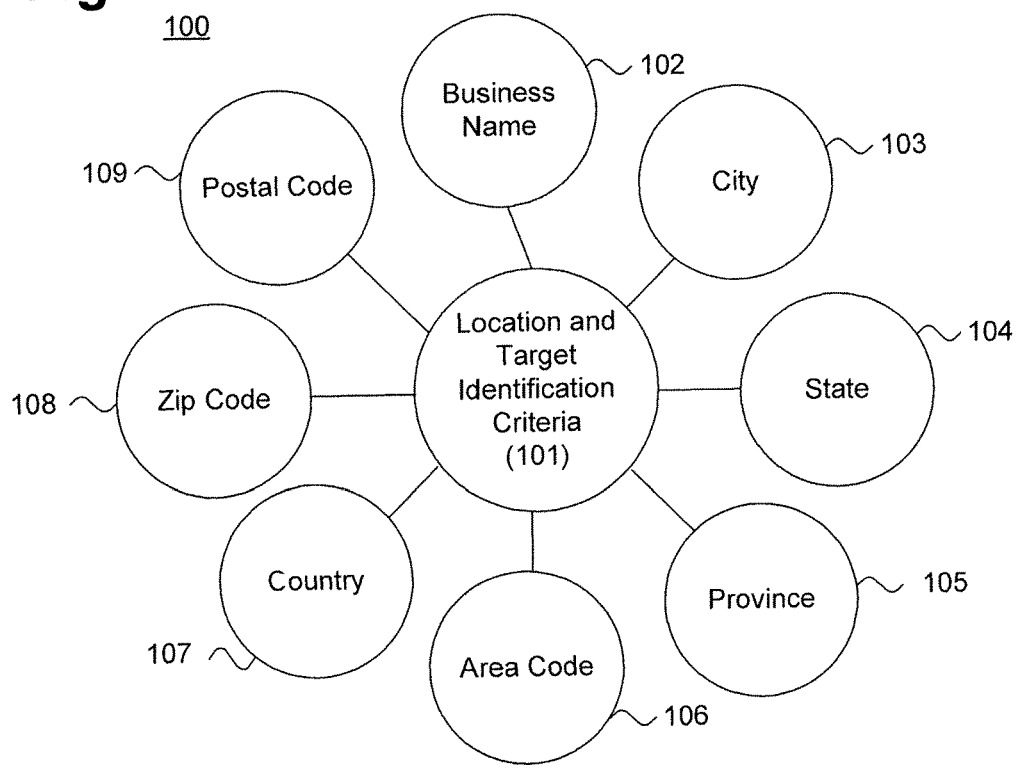
FIG. 8 is a data flow diagram showing location and target identification criteria for retaining call recordings into a call center.

The location and target identification criteria can identify businesses, special interest groups, and competitors, as well as a location of the business, special interest group, competitor, or individual caller. FIG. 8 is a data flow diagram 100 showing location and target identification criteria 101 for retaining call recordings into a call center. The criteria 101 include business name 102, city 103, state 104, province 105, country 107, area code 106, zip code 108, and postal code 109, as well as other criteria. The location and target identification criteria can be useful for retaining calls originating from a particular demographic area.

Figure 9:
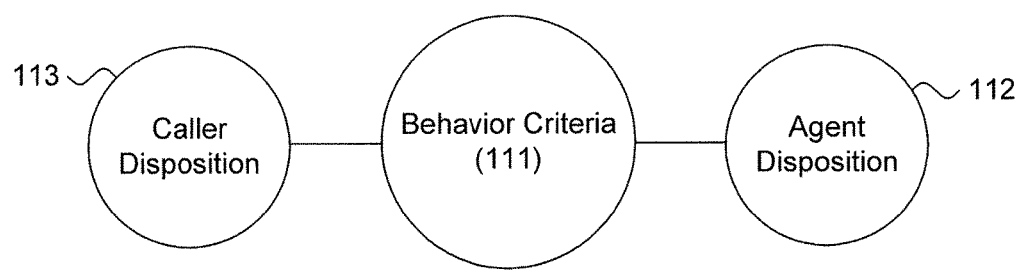
FIG. 9 is a data flow diagram showing behavior criteria for retaining call recordings into a call center.

The behavior criteria identify behavior of an agent or caller, such as exemplary or unprofessional behavior during a call interaction. FIG. 9 is a data flow diagram 110 showing behavior criteria 111 for retaining call recordings into a call center. The criteria can include agent disposition 112 and customer disposition 113. Calls that were retained based on agent 112 and customer behavior 113 can be used to improve ways to deal with a customer in different call scenarios, as well as other uses and examples.

Figure 10:
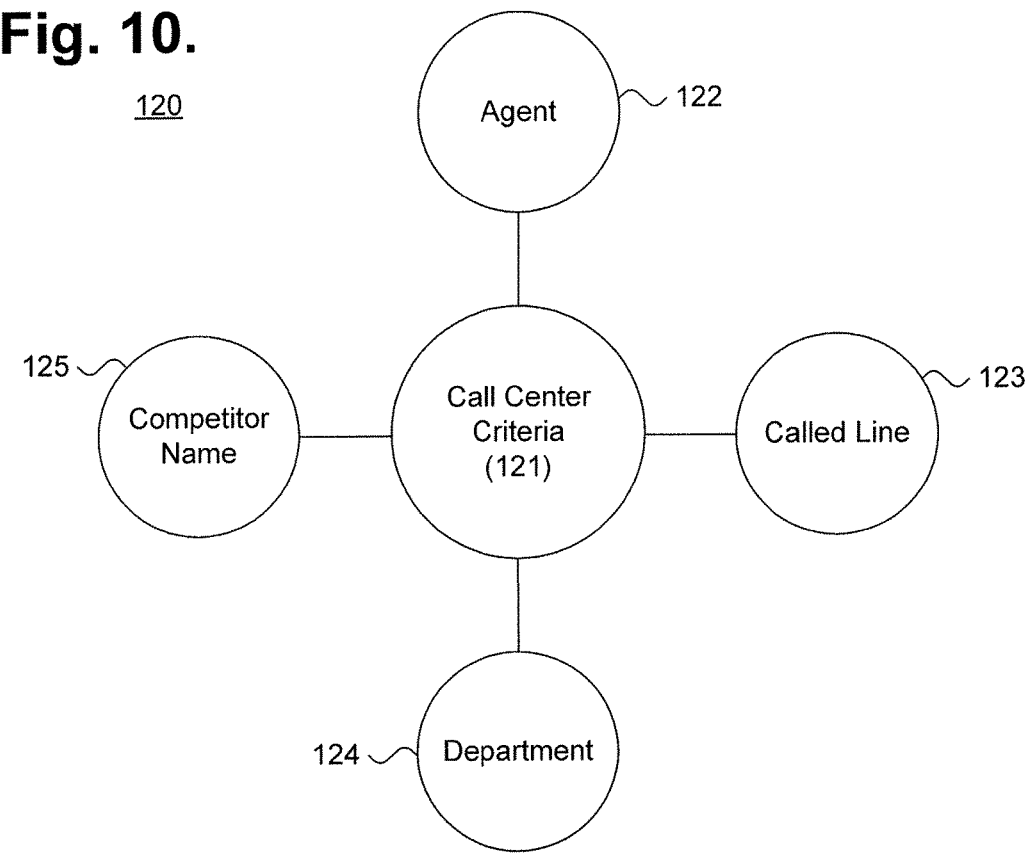
FIG. 10 is a data flow diagram showing call center criteria for retaining call recordings into a call center.

The call center criteria are based upon elements related to the call center, which can be used to track business flow and work productivity. FIG. 10 is a data flow 120 diagram 120 showing call center criteria 121 for retaining call recordings into a call center. The criteria 121 include a particular agent 122, called telephone line 123, department 124, and competitor name 125. The call center criteria can assist an agent, manager, or supervisor in tracking and calculating call center statistics, agent progress, and company success, or to pre-screen calls. For example, all calls received by a particular agent or group of agents can be selected for storing based on the agent's name or identification number, as well as other identifiers. The stored calls for that agent can provide information regarding the agent's progress, such as call statistics, sold products, and customer feedback. Other call center criteria 121 are possible.

The criteria 80, 91, 101, 111, 121, 131 can be programmed into one or more of the watchers for monitoring the interaction between the customer and the call center. Each watcher can store the same or select criteria. In addition, the criteria can be stored individually or by groups of criteria. Once a watcher identifies a call satisfying one or more criteria, the call recording is retained in the call center for storage and indexing.

A retained call could satisfy multiple criteria, including criteria from different groups. For example, a premium customer calls into the call center to make a complaint. The customer is identified by his telephone number. The watchers are programmed with the customer complaint and telephone number criteria and will automatically retain the call recording for storage. More specifically, multiple criteria can be satisfied simultaneously or individually. Returning to the example, the premium customer calls into the call center. The call is received by the ACD, which is coupled to an ACD watcher. The ACD watcher is programmed with the premium customer's telephone number, which is identified by the watcher for storing. However, if the ACD watcher does not include the telephone number, the call can then be distributed to the IVR. An IVR watcher is programmed with the premium customer and customer complaint criteria. Thus, the call recording will be retained based on both criteria. Other methods and combinations for call criteria retention are possible.

Each retained call recording is transferred from the temporary storage device to the call center database, where the calls can be indexed using the satisfied criteria, call factors, and other identifiers. Alternatively, if no criteria 80, 91, 101, 111, 121, 131 are met, the call recording can be discarded.

The calls, which do not meet any of the pre-selected criteria or that are not otherwise retained, can be discarded from the temporary storage after a fixed time period, which can be automatically set or selected by an agent or supervisor. Other discarding methods and times are possible. A time period for discarding a call recording can apply to each individual call or to a group of calls. Additionally, records of discarded and stored calls can be maintained as reference. Once the retained calls are stored, post-processing actions can be conducted to assist an agent or supervisor in locating a particular call for review. FIG. 11 is a data flow diagram 130 showing post-processing actions 131 for performing upon a stored call recording. Post-processing actions 131 include reviewing 132, sorting 133, transferring 134, and copying 135 of the call recordings. These actions provide the call center with additional information in the form of call recordings, statistics, learning tools, and references, which can be beneficial to a call center business.

Post-processing actions also include reviewing a call 132 for assessing an agent's performance, ensuring that a sales script is followed, and analyzing problems with the call center. In addition, statistical data 136 can be generated, a directory 137 can be produced, and an alert 138, when appropriate, can be sent using the content of the stored recordings. The post-processing actions 131 can be performed separately or as a group of sequential actions. One or more post-processing actions 131 can be used together to obtain information. For instance, a directory 137 of all calls received by the call center can be maintained to assist agents and supervisors in searching for a particular call. The calls listed in the directory can be sorted 133 using any of the stored identifiers, such as a call identifier or customer name. Post-processing alerts 138 are used to notify agents or supervisors of particular calls, such as emergency calls, or calls that involve stolen credit card information. The alerts 138 may also be used for other types of calls based upon the pre-selected criteria or independent selection of a call by an agent or supervisor. The alert 138 can be sent via an email, telephone call, text message, or other means to announce that a particular call recording is available. Other post-processing actions are possible.

In one embodiment, all received calls are automatically marked for storage. If none of the criteria are met, the call recording is not retained and can be discarded. Alternatively, an agent, supervisor, or watcher can mark the calls for storage based on criteria, preference, or usefulness. In addition, scripts can also determine whether a call recording will be retained or discarded. For example, a script that obtains a customer's information for providing a credit card balance may also indicate that the call recording will be discarded once the script terminates. Other scripted actions are possible.

In a further embodiment, a decision to store or discard a call recording can be based upon a voting system, or upon a hierarchy to ensure that a correct decision is made regarding a particular call. For example, in a voting system, the watcher, agent, and supervisor must all approve the non-retention of a call; otherwise, the call will be stored. In a hierarchy system, some criteria can be considered more important than others, such as calls that abnormally terminate or which cause system glitches. For example, a call that causes system error and malfunctions can be considered important and stored for further review. In contrast, criteria, such as sales and upsells may not be considered individually important; however, when combined in one call, the two criteria can be considered significant and the corresponding call recording can be stored. Other hierarchies and voting systems are possible.

In yet a further embodiment, notification regarding the amount of calls in the call center database can be provided to alert the agent, manager, or supervisor, when the storage below capacity, near capacity, or full. In addition, the storage database can provide the notifications at predetermined time intervals or as requested by the agent, manager, or supervisor, as well as others.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for retention of call recordings, comprising:
   a recorder to record each of a plurality of calls;
   an automatic call distributor to receive the plurality of calls, wherein a set of criteria associated with the automatic call distributor is applied to the calls and the recordings of the calls that satisfy the criteria are provided to a database;

a component of an IVR system to receive from the automatic call distributor one or more of the calls remaining;

a first watcher to apply a set of criteria associated with the IVR to the one or more remaining calls, wherein the recordings for at least one of the one or more remaining calls that satisfy the criteria associated with the IVR are provided to the database and each call still remaining is provided to an agent;

and a second watcher to apply a set of criteria associated with the agents to the calls still remaining, wherein the recordings for at least one of the still remaining calls that satisfy the criteria associated with the agents are provided to the database.

2. A system according to claim 1, wherein the recordings of the calls that do not satisfy the criteria associated with the automatic call distributor, the IVR, and the agents are discarded.

3. A system according to claim 2, wherein a time period for discarding the call recordings that do not satisfy the criteria associated with the automatic call distributor, the IVR, and the agents is applied.

4. A system according to claim 2, wherein a record of the discarded call recordings is stored.

5. A system according to claim 1, wherein the criteria associated with the automatic call distributor, the IVR, and the agents are the same or different.

6. A system according to claim 1, wherein the recordings of the plurality of calls are received into a temporary storage.

7. A system according to claim 1, wherein each of the recordings of the calls that satisfy criteria associated with one of the automatic call distributor, IVR, and agents are provided to the database for retention one of prior to and after an interaction with a caller associated with that call.

8. A system according to claim 1, wherein the recordings of the calls that satisfy the criteria associated with the automatic call distributor, the IVR, and the agents are provided to the database when the call recordings are approved by at least one individual.

9. A system according to claim 1, wherein the call recordings are transferred to the database for training.

10. A system according to claim 1, wherein instructions from an individual to override the transfer of the call recordings to the database are received.

11. A computer-implemented method for retention of call recordings, comprising:

receiving a plurality of calls;

recording each of the plurality of calls;

providing the calls to an automatic call distributor;

applying a set of criteria associated with the automatic call distributor to the calls;

providing the recordings of the calls that satisfy the criteria to a database;

transferring one or more of the calls remaining to an IVR;

applying a set of criteria associated with the IVR to the one or more calls remaining;

providing the recording for at least one of the one or more remaining calls that satisfy the criteria associated with the IVR to the database;

transferring each call still remaining to an agent;

applying a set of criteria associated with the agents to the calls still remaining; and providing the recordings for at least one of the still remaining calls that satisfy the criteria associated with the agents to the database.

12. A method according to claim 11, further comprising:

discarding the recordings of the calls that do not satisfy the criteria associated with the automatic call distributor, the IVR, and the agents.

13. A method according to claim 12, further comprising:

applying a time period for discarding the call recordings that do not satisfy the criteria associated with the automatic call distributor, the IVR, and the agents.

14. A method according to claim 12, further comprising:

maintaining a record of the discarded call recordings.

15. A method according to claim 11, wherein the criteria associated with the automatic call distributor, the IVR, and the agents are the same or different.

16. A method according to claim 11, wherein the recordings of the plurality of calls are received into a temporary storage.

17. A method according to claim 11, wherein each of the recordings of the calls that satisfy criteria associated with one of the automatic call distributor, IVR, and agents are provided to the database for retention one of prior to and after an interaction with a caller associated with that call.

18. A method according to claim 11, further comprising:

providing the recordings of the calls that satisfy the criteria associated with the automatic call distributor, the IVR, and the agents to the database when the call recordings are approved by at least one individual.

19. A method according to claim 11, further comprising:

utilizing the call recordings transferred to the database for training.

20. A method according to claim 11, further comprising:

allowing an individual to override the transfer of the call recordings to the database.

* * * * *